US008659707B2

(12) United States Patent
Toyoda

(10) Patent No.: US 8,659,707 B2
(45) Date of Patent: Feb. 25, 2014

(54) TELEVISION RECEIVER APPARATUS AND CONTROL METHOD FOR BATTERY AND POWER-SAVING OPERATIONS

(75) Inventor: Takeshi Toyoda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 13/371,201

(22) Filed: Feb. 10, 2012

(65) Prior Publication Data

US 2012/0320273 A1 Dec. 20, 2012

(30) Foreign Application Priority Data

Jun. 14, 2011 (JP) .................................. 2011-132405

(51) Int. Cl.
*H04N 3/27* (2006.01)
*H04N 5/63* (2006.01)
*H04N 3/14* (2006.01)

(52) U.S. Cl.
USPC ............................ 348/730; 348/790; 348/554

(58) Field of Classification Search
USPC ......... 348/790, 730, 554, 555, 581, 632, 633, 348/794, 558, 738, 706; 345/102, 211, 212
See application file for complete search history.

(56) References Cited

U.S. PATENT DOCUMENTS

| | | | |
|---|---|---|---|
| 7,138,175 B2 * | 11/2006 | Saito ........................... | 428/304.4 |
| 2004/0183768 A1 * | 9/2004 | Yamato et al. .................. | 345/98 |
| 2005/0270265 A1 * | 12/2005 | Plut .............................. | 345/102 |
| 2006/0285024 A1 * | 12/2006 | Chou et al. .................... | 348/790 |
| 2007/0042813 A1 * | 2/2007 | Ito ................................ | 455/573 |
| 2007/0146354 A1 * | 6/2007 | Kubota et al. ................ | 345/204 |
| 2007/0297754 A1 * | 12/2007 | Wada ............................ | 386/46 |
| 2009/0023482 A1 * | 1/2009 | Koura et al. .................. | 455/574 |
| 2009/0167946 A1 * | 7/2009 | Samada et al. ............... | 348/558 |
| 2009/0201271 A1 | 8/2009 | Michiyasu et al. | |
| 2010/0082414 A1 | 4/2010 | Shimaya | |
| 2012/0188463 A1 * | 7/2012 | Deshpande et al. .......... | 348/730 |

FOREIGN PATENT DOCUMENTS

| | | |
|---|---|---|
| JP | 06-149173 | 5/1994 |
| JP | 2005-222564 | 8/2005 |
| JP | 3730414 | 10/2005 |
| JP | 2006211421 | 8/2006 |
| JP | 2007134930 | 5/2007 |
| JP | 2007-219234 | 8/2007 |
| JP | 2010079025 | 4/2010 |
| WO | WO 2006040998 | 4/2006 |

OTHER PUBLICATIONS

Japanese Patent Application No. 2012-132405; First Office Action; Mailed Apr. 24 2012 (with English translation).

* cited by examiner

*Primary Examiner* — Victor Kostak
(74) *Attorney, Agent, or Firm* — Blakely, Sokoloff, Taylor & Zafman LLP

(57) ABSTRACT

According to one embodiment, a television receiver apparatus capable of operating with a battery, includes a receiver, a first switching module, a second switching module, and a power supply controller. The receiver is configured to receive first and second mode signals. The first switching module is configured to turn on/off a battery operation mode according to the first mode signal received by the receiver. The second switching module is configured to turn on/off a power saving mode according to the second mode signal received by the receiver. The power supply controller is configured to control power supply according to the modes set by the first and second switching modules.

20 Claims, 11 Drawing Sheets

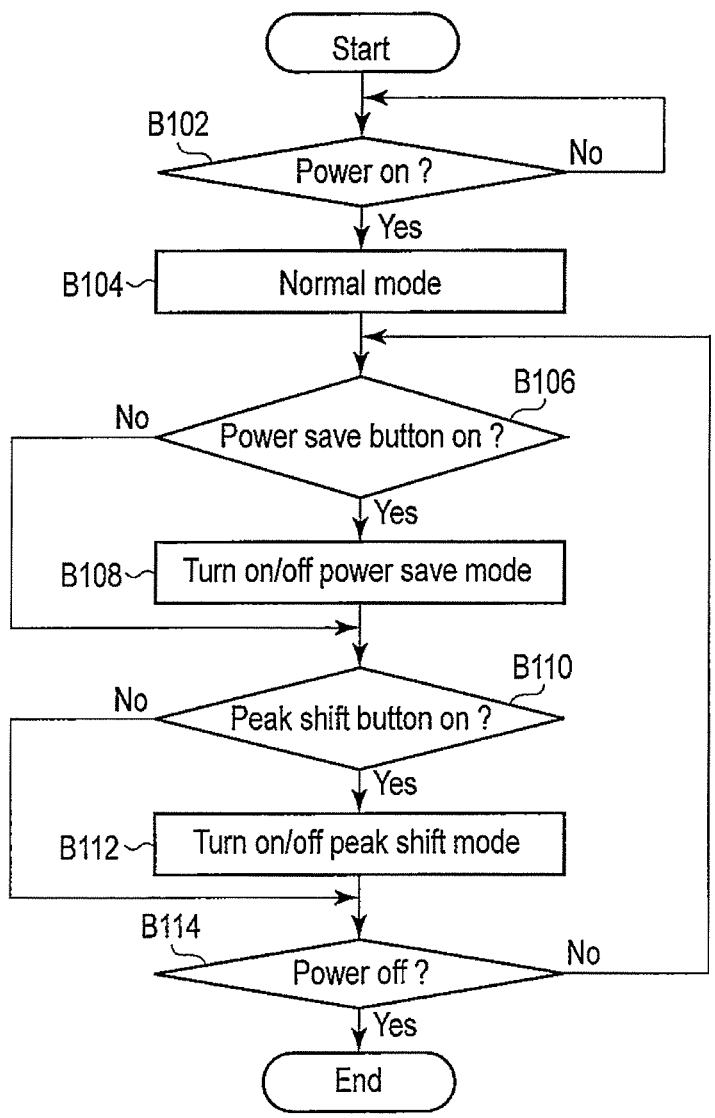
F I G. 4

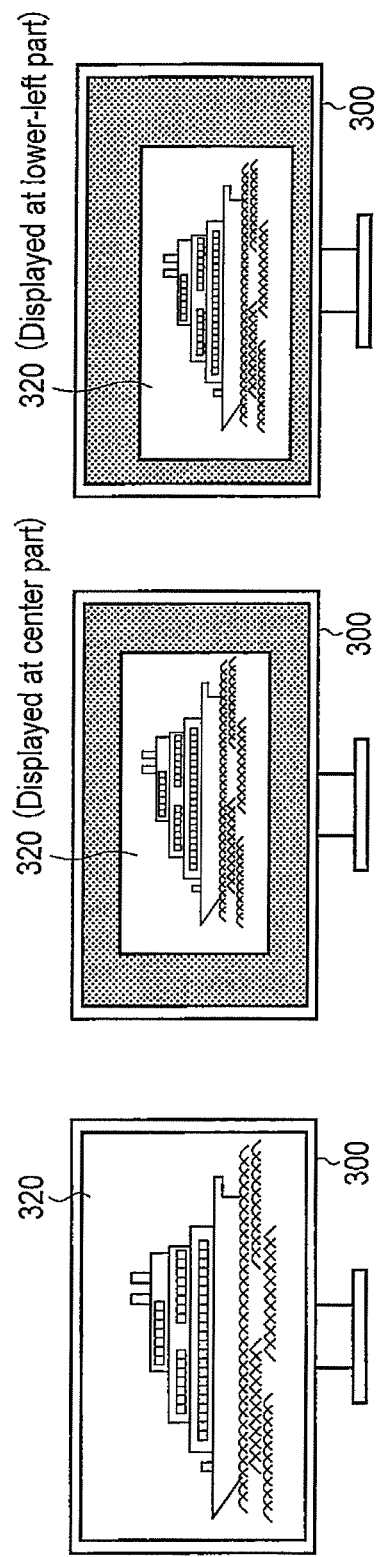
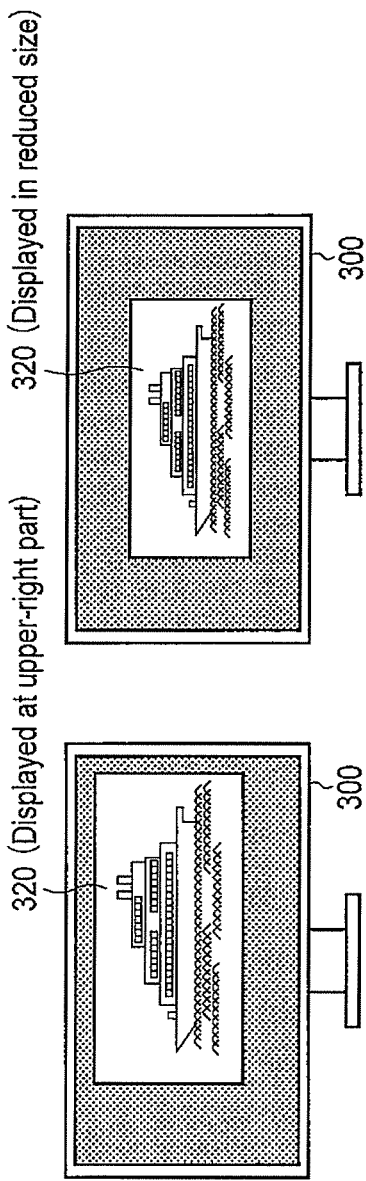

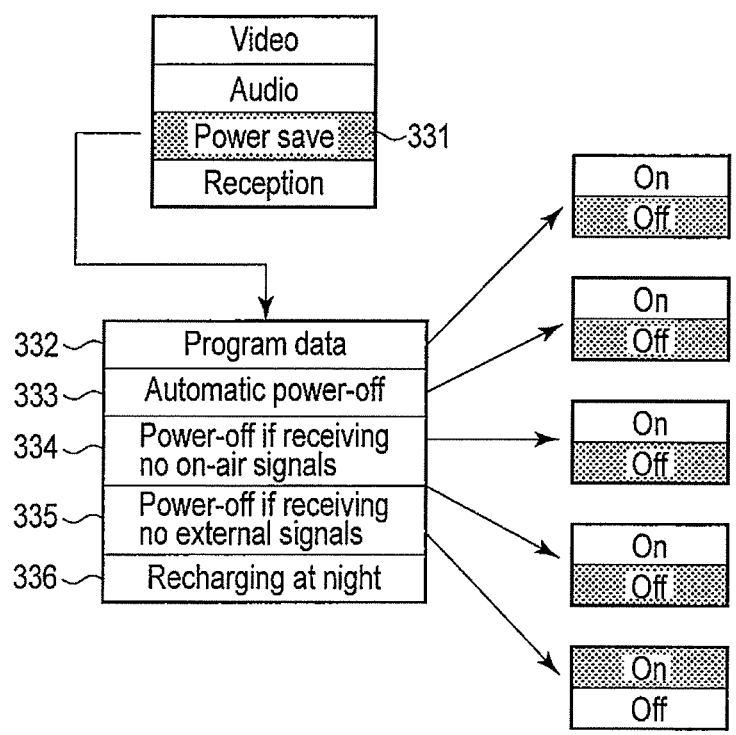
F I G. 11

TELEVISION RECEIVER APPARATUS AND CONTROL METHOD FOR BATTERY AND POWER-SAVING OPERATIONS

CROSS-REFERENCE TO RELATED APPLICATIONS

This application is based upon and claims the benefit of priority from prior Japanese Patent Application No. 2011-132405, filed Jun. 14, 2011, the entire contents of which are incorporated herein by reference.

FIELD

Embodiments described herein relate generally to a television receiver apparatus that can operate with a battery and a control method for the television receiver apparatus.

BACKGROUND

Various kinds of portable electronic devices such as a notebook personal computer (PC) and a PDA are developed. This kind of electronic device is configured to operate with any one of an AC power source and a battery in view of not only mobile use where no AC commercial power supply is provided but also indoor use in, e.g., office and home. The used battery is usually a rechargeable secondary battery such as a nickel-metal hydride battery and a lithium ion battery.

In many cases, whether a commercial power supply or a battery is to be used is determined by whether an AC adapter is connected or not. When the AC adapter is connected to the PC, the power supply of the PC is switched from the battery to the AC adapter, and the battery is charged with the AC adapter. While the AC adapter is detached from the PC, the battery is used as a driving power supply.

In recent years, the amount of electric power demand is more than the amount of electric power provided from a power plant of an electrical supply company, and it is considered that this may cause major power outage. To avoid this, scheduled outage or rolling blackout is considered to be carried out by the electrical supply company to stop/resume electric power supply in each of certain areas in turn. Among household electric devices, a television receiver apparatus consumes relatively large electric power. Therefore, reduction of electric power demand by the television receiver apparatus is considered. For example, like a conventional PC, a television receiver apparatus having a battery therein is considered, so that the television receiver apparatus operates with either the AC commercial power supply or the battery.

However, even though the battery control of the conventional PC is applied to the television receiver apparatus without any modification, the electric power demand cannot be reduced greatly.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary flowchart illustrating an example of operation of the television receiver apparatus of FIG. 1.

FIGS. 7A, 7B, 7C, 7D and 7E are exemplary figures illustrating typical examples of screens on the display device while the television receiver apparatus of FIG. 1 performs power saving operation.

FIG. 11 is exemplary figure illustrating an example of a menu when the power saving setting is set in the television receiver apparatus of FIG. 1 to save energy.

DETAILED DESCRIPTION

Various embodiments will be described hereinafter with reference to the accompanying drawings.

In general, according to one embodiment, television receiver apparatus capable of operating with a battery, includes a receiver, a first switching module, a second switching module, and a power supply controller. The receiver is configured to receive first and second mode signals. The first switching module is configured to turn on/off a battery operation mode according to the first mode signal received by the receiver. The second switching module is configured to turn on/off a power saving mode according to the second mode signal received by the receiver. The power supply controller is configured to control power supply according to the modes set by the first and second switching modules.

An embodiment will be described with reference to the drawings.

Figure 1:
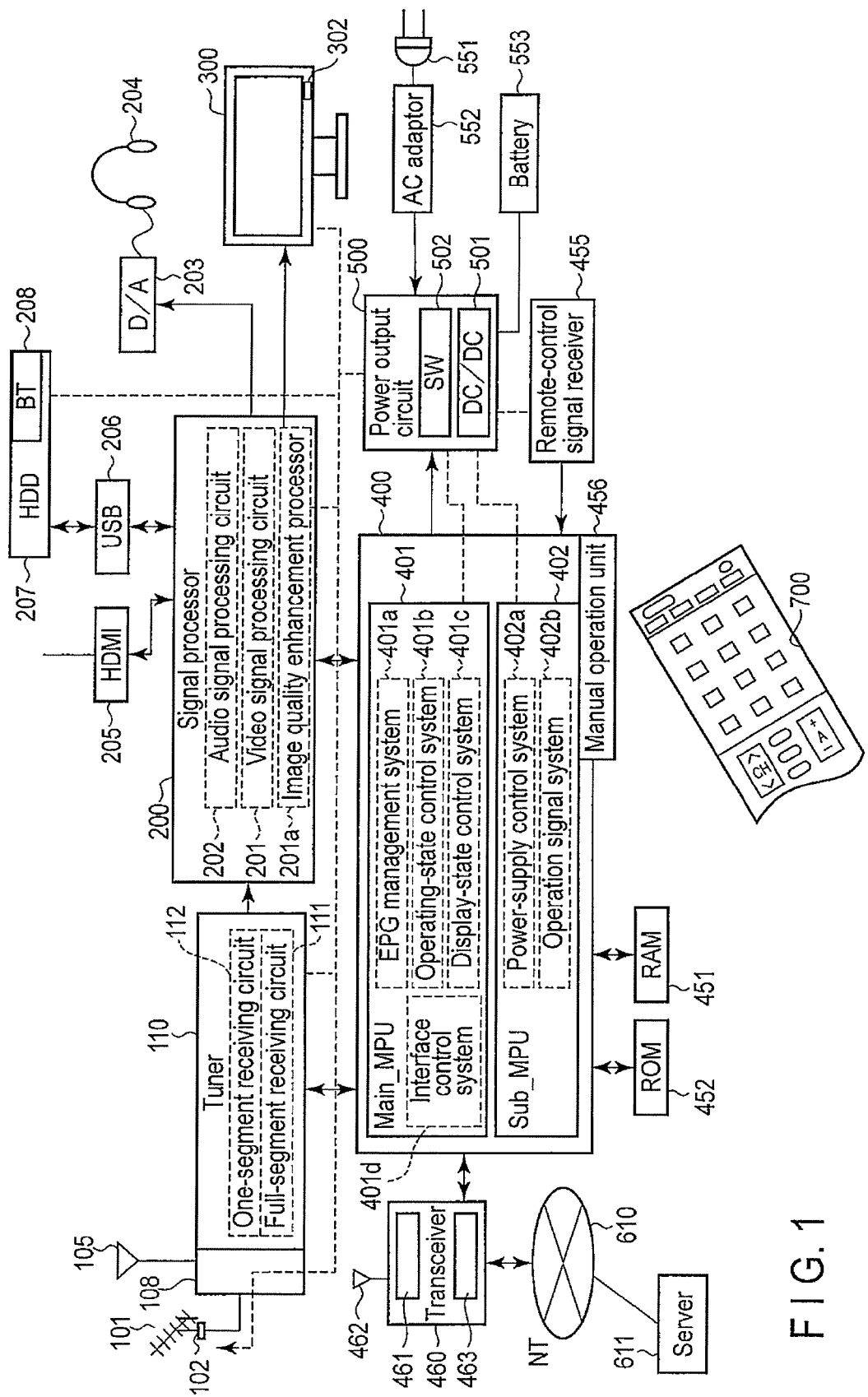
FIG. 1 is an exemplary block diagram illustrating a typical example of an entire configuration of an apparatus of an embodiment.

FIG. 1 shows a stationary television receiver 100 to which the embodiment is applied. An UHF antenna 101 catches terrestrial television broadcast waves. If an intensity of a reception wave is weak, a booster (amplifier) 102 is connected to the antenna 101. If the intensity of the reception wave is too strong, an attenuator (not shown) is connected to the antenna 101. Power is supplied to the booster 102 and the attenuator. The existing terrestrial digital broadcasting system transmits a twelve-segment (it may be referred to a full-segment or a full-seg) broadcast signal and a one-segment (it may be referred to one-seg) broadcast signal. The UHF antenna 101 is used to receive the full-segment broadcast signal. An indoor antenna 105 is used to receive the one-segment broadcast signal.

The UHF antenna 101 may also be referred to an "external antenna" or "outdoor antenna." The indoor antenna 105 may also be referred to an "internal antenna."

The UHF antenna 101 is connected to a tuner 110 via an antenna connection board 108. The indoor antenna 105 is connected to the tuner 110 via the antenna connection board 108. If the antenna connection board 108 comprises a single antenna connector, to use the indoor antenna 105 in place of the UHF antenna 101, the terminal of the UHF antenna 101 is pulled from the connector of the antenna connection board 108, and the terminal of the indoor antenna 105 is connected to the connector of the antenna connection board 108. If the antenna connection board 108 comprises two antenna connectors, both the UHF antenna 101 and the indoor antenna 105 may be connected at all times to the two connectors of the antenna connection board 108, respectively. In this case, a changeover switch may be operated to connect either the UHF antenna 101 or the indoor antenna 105 to the tuner 110, so that the antenna selected may be used.

The tuner 110 includes a full-segment receiving circuit 111 and a one-segment receiving circuit 112. The full-segment receiving circuit 111 or the one-segment receiving circuit 112 is set to a signal receiving state in accordance with a control signal output from a control block 400. The control block 400 will be described later in detail.

The tuner 110 is operated to select a channel. The program signal of the channel selected in the tuner 110 is demodulated and input to a signal processor 200. The signal processor 200 includes a video signal processing circuit 201 and an audio signal processing circuit 202. The video signal processing circuit 201 decodes an encoded video signal to a base-band video signal. As encoding and decoding schemes, there are the Moving Picture Experts Group (MPEG) and H.264/Advanced Video Coding (AVC) system, etc., for example. The signal processor 200 includes an image quality enhancement processor 201a which performs a resolution interpolation processing, a processing for improving a color and a dynamic range, and a processing for increasing the number of frames. The base-band video signal output from the video signal processing circuit 201 is supplied to a display 300. The display 300 includes a liquid crystal display, a plasma display, or an organic electroluminescence display.

The audio signal processing circuit 202 acquires an audio stream from the program signal and then decodes the audio stream. The decoded audio signal is supplied to a digital-to-analog converter 203 and converted to an analog audio signal which is supplied to a speaker 204. In the system of FIG. 1, the speaker 204 is shown as a headphone. The headphone can, of course, be replaced by a stationary speaker.

The signal processor 200 is connected to an external apparatus under the control of the control block 400. The signal processor 200 is connected by, for example, a high-definition multimedia interface (HDMI) 205 to an external data record/playback apparatus such as an optical disk player, for example a DVD (trademark) or BD (trademark) player. The signal processor 200 therefore receives playback signals from the external data record/playback apparatus and processes these signals to generate video and audio output signals. Further, the signal processor 200 transmits the signals used for recording to the external data record/playback apparatus. The HDMI 205 transmits a high quality digital video/audio signal to the external data record/playback apparatus, as it is. The digital signal includes 480i, 480o, 720p, 1080i, and 1080p signals.

Under control of the control block 400, the signal processor 200 also is connected via a universal serial bus (USB) 206 to a hard disk drive (HDD) 207. The hard disk drive 207 incorporates a battery 208, and keeps operating for two to three hours upon a blackout by using the battery. Moreover, the hard disk drive 207 supplies power from the battery to some other blocks shown in FIG. 1 under the control signal.

The control block 400 includes a main microprocessor unit (hereinafter referred to as "main MPU") 401 and a sub-microprocessor unit (hereinafter referred to as "sub-MPU") 402. The main MPU 401 includes an electronic program guide management system (hereinafter referred to as an "EPG management system") 401a, an operating-state control system 401b, a display-state control system 401c, and an interface control system 401d.

The components 400, 401 and 402 and the components 401a, 401b, 401c, and 401d may be given names other than those specified above. They may be called, for example, "main control circuit", "sub-control circuit", "EPG processing circuit", "operating-state control circuit", "display-state control circuit", and "HDMI-state control circuit". Alternatively, they may be called "modules" or "blocks". Their names specified above accord with the functions they perform. Instead, other names may be used, each indicating that two or more components are integrated or combined.

The EPG management system 401a acquires program data through the Internet or the program data contained in a broadcast signal, and generates program list data. The program list data is stored in a random access memory (hereinafter referred to as "RAM") 451. Further, the EPG management system 401a cooperates with the display-state control system 401c to read the program list stored in the RAM 451 and output the same to the display 300. Moreover, the EPG management system 401a corrects and changes in periodically the program data stored in the RAM 451.

The RAM 451 may be any memory in which data is written and from which data is read, and includes a nonvolatile memory. The RAM 451 may, of course, store various data items (e.g., icons, warning messages, and channel numbers). A read only memory (ROM) 452 is connected to the control block 400, and stores various software items for use in the television receiver 100. The software is extended in, for example, the RAM 451, operating the television receiver 100 in accordance with signals and instructions the user has input.

In response to the state signals generated internally or supplied externally or to operation signals supplied externally, the operating-state control system 401b controls the blocks incorporated in the television receiver 100. The operating-state control system 401b switches the tuner 110, from the one-segment receiving state to the full-segment receiving state, or vice versa. Further, the operating-state control system 401b controls the signal processing state in the signal processor 200. Still further, the operating-state control system 401b controls color adjustment, luminance adjustment, partial shut-off of power supply, and the like, automatically or manually in accordance with the conditions preset.

The display-state control system 401c adjusts the backlight of the display 300 and controls the illumination area of the backlight. The display-state control system 401c further controls the luminance of the video signal, the image magnification and reduction and the motion of a display position.

The interface control system 401d transmits an inquiry signal to an external apparatus connected to an HDMI terminal. The interface control system 401d determines a kind and state of the external recording/reproducing apparatus based on a result of the inquiry and transmits a control signal or data signal to the external apparatus through the signal processor 200.

The sub-MPU 402 includes a power-supply control system 402a and an operation signal system 402b. The operation signal system 402b receives an operation signal transmitted from a remote controller 700 through a remote-control signal receiver 455 and analyzes the operation signal. In accordance with the result of analyzing the operation signal, the operation signal system 402b controls the operating state of the television receiver 100. More precisely, the operation signal system 402b turns on or off the main power supply of the television receiver 100, activates or deactivates the main MPU 401 or gives commands to the sub-MPU 402. Operation signals come from not only the remote-control signal receiver 455, but also from a manual operation unit 456. When the manual operation unit 456 is operated by the user, an operation signal from the manual operation unit 456 is analyzed by the operation signal system 402b.

The power supply system of the television receiver 100 will be described. The commercially available AC power from a plug 551 connected to a wall socket is supplied to a power output circuit 500 through an AC adaptor 552, as a DC voltage (e.g., 12V/3 A). The power output circuit 500 is also received a power from a battery 553. The power output circuit 500 converts the output of the AC adaptor 552 or the battery 553 to various DC voltages (e.g., 12V/3 A) by using a DC-to-DC converter 501. If the AC adaptor 552 is not provided, the power output circuit 500 rectifies the commercially available AC power.

Under the control of the power-supply control system 402a, the power output circuit 500 switches the power-use state of the television receiver 100, from the use of commercially available power to the use of battery power, or vice versa. The power-use state can be switched when the switch 502 is controlled by the power-supply control system 402a.

A transceiver 460 is connected to the control block 400. The transceiver 460 includes a short-distance wireless communication device 461. The short-distance wireless communication device 461 communicates with a mobile terminal (not shown) via an antenna 462. The transceiver 460 further includes a network communication device 463. The network communication device 463 is connected to a network 610, and performs data communication with a server 611. The mobile terminal may be one of various types, such as a mobile telephone. The mobile terminal has, at least, a transceiver, a display, an operation unit and a signal processor and is small enough to carry.

Figure 2:
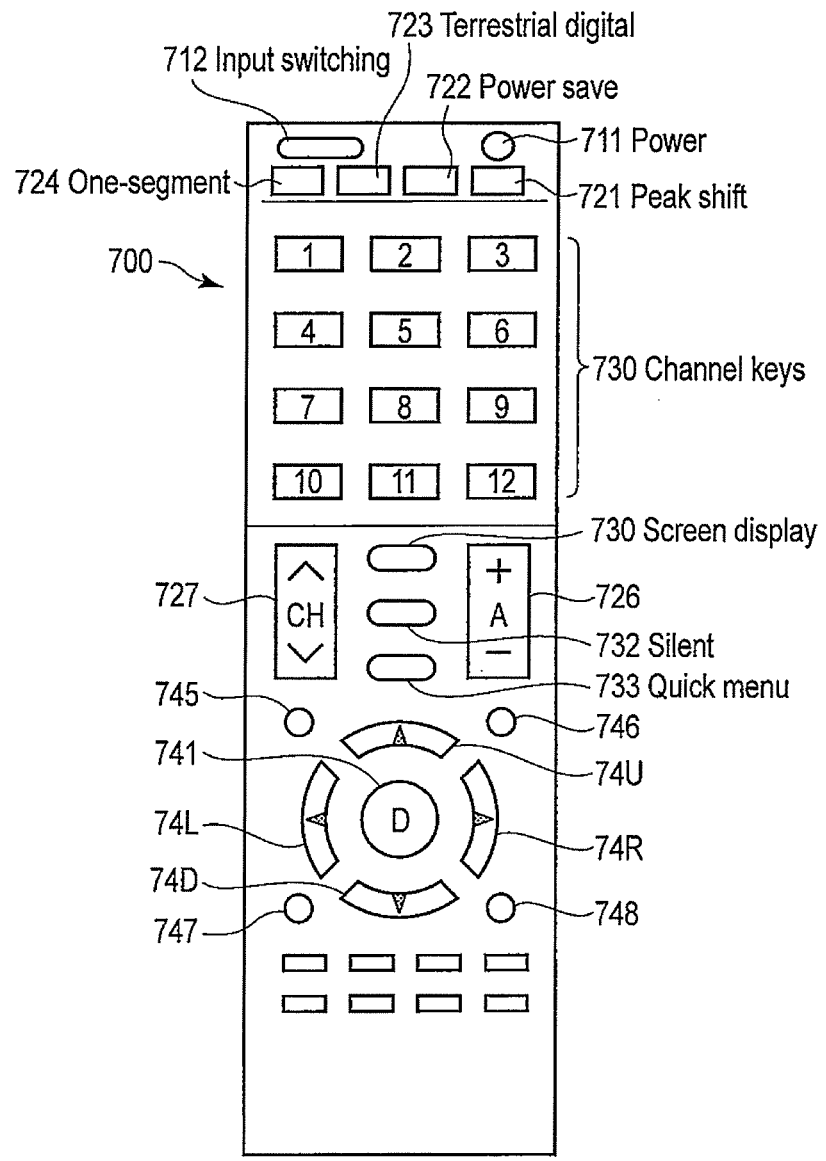
FIG. 2 is an exemplary figure illustrating a typical overview of a remote controller of FIG. 1.

FIG. 2 shows the various buttons provided on the remote controller 700. The power button 711 may be pushed to turn on or off the television receiver 100. As the user repeatedly pushes the power button 711, the television receiver 100 is repeatedly turned on and off.

A power supply indication lamp 302 is provided at a lower portion of a frame body of the display 300. When the power is off, and a power button (not shown) of a manual operation unit 456 or the power button 711 of the remote controller 700 is pressed, the indication lamp 302 lights in green. While the power supply indication lamp 302 lights in green, this indicates that the power is on, a program list table information is being retrieved, and software is being downloaded. When the power button of the manual operation unit 456 or the power button 711 of the remote controller 700 is pressed in this state, the indication lamp 302 lights in red. While the power supply indication lamp 302 lights in red, this indicates that the power is off (standby state), and the battery 533 is fully charged. When the battery 533 is being charged, the power supply indication lamp 302 lights in orange. When the plug 551 is disconnected or the power is turned off while the battery 533 is used, the power supply indication lamp 302 is extinguished.

Even when the power of the television receiver apparatus is turned off with the power button of the manual operation unit 456 or the power button 711 of the remote controller 700, the sub-MPU 402 and a remote controller signal reception device 455 explained in FIG. 1 receive auxiliary power from the power output circuit 500, and receive an operation signal transmitted by the remote controller 700.

The input switch button 712 is a button for switching between a retrieving state and a non-retrieving state. In the retrieving state, input given by an external device connected to the television receiver apparatus is retrieved. For example, when the input switch button 712 is repeatedly pressed, the state changes to a digital broadcast reception state, a signal retrieving state from the HDMI 205, a video input state, a D terminal (not shown in FIG. 1) input state, and a digital broadcast reception state.

A peak shift button 721 is used to cooperate to reduce the amount of consumption of the electric power provided by an electric power supply source (electric power supply plant of power company). When the peak shift button 721 is manipulated, the television receiver apparatus is switched to either a state in which the commercial power supply is used or a state in which the battery 553 is used. Accordingly, every time the peak shift button 721 is pressed, the power supply is switched between the plug 551 and the battery 533. When electric power demand increases in a time period at noon in the middle of the summer, the peak electric power demand can be reduced by pressing the peak shift button 721 to change to battery operation in a time period in which the demand may be more than the amount of supplied electric power. When the battery 553 is thus used, this can contribute to avoiding the peak of electric power consumption in the society. Alternatively, in a time period in which the electric power demand may be more than the amount of supplied electric power, a server 611 may give an operation switch command to automatically switch between the commercial power supply operation and the battery operation. Even though the television receiver apparatus automatically switches to the battery operation, the television receiver apparatus can be returned to the commercial power supply operation mode by thereafter pressing the peak shift button 721 again.

When the peak shift button 721 is pressed while the power is off, the television receiver apparatus operates with the battery 533.

To watch television with the battery 533, the battery 533 must be charged. When the power supply indication lamp 302 lights in orange, the battery 533 is being charged, and cannot be used.

When the plug 551 is connected to the outlet, charging to the battery 533 begins, and the power supply indication lamp 302 lights in orange. When the charging is finished, the power supply indication lamp 302 changes to red. When fully charged, the charging does not begin, and the power supply indication lamp 302 lights in red. When the power is ON (the power supply indication lamp 302 lights in green), the battery 533 is not charged. However, the television receiver apparatus is configured not to charge the battery 533 while a program is watched. In other words, the power output circuit 500 has a function of charging the battery 553 from the commercial power supply, but when the television receiver apparatus is in program display operation state, the power output circuit 500 prohibits charging operation.

The battery 533 may not be charged at all times. The charging may be controlled by timer under the control of the control block 400, so that the battery 533 is charged in the standby state in a night-time period in which the amount of used electric power is lower than that in day time (for example, time period from 9 p.m. to 9 a.m.). In this case, the peak amount of used electric power can be reduced, and moreover, the electrical power charge can be saved. For example, the television receiver apparatus can display a menu concerning charging. Within the items of the menu display, an item for setting a charging time is prepared. When the user manipulates the remote controller 700, selects a desired time period, and manipulates an enter button 741, the battery is charged in a desired time period as long as power failure does not occur.

In some cases, the user cannot watch broadcast during power failure during which time power supply to the booster 102 of the antenna 101 stops. In such case, by switching to the indoor antenna 105, one-segment broadcast can be received even during power failure. For example, this television receiver apparatus aims to operate for about three hours with the battery in accordance with the maximum time of scheduled outage. To ensure the battery operation time, the brightness of the screen may be reduced to reduce the power consumption when switched to battery operation. Alternatively, the battery operation time may be set in advance, and how much the amount of consumed electric power is reduced may be varied in accordance with the remaining amount of the battery and the remaining time of the battery operation time.

Various measures can be taken to detect blackouts. The power-supply control system 402a is connected to, for example, a backup capacitor, and can keep operating for a prescribed time even if a blackout takes place. Therefore, the changes in the voltage on the power supply lines and the output of the AC adaptor 552 can be detected.

Figure 3:
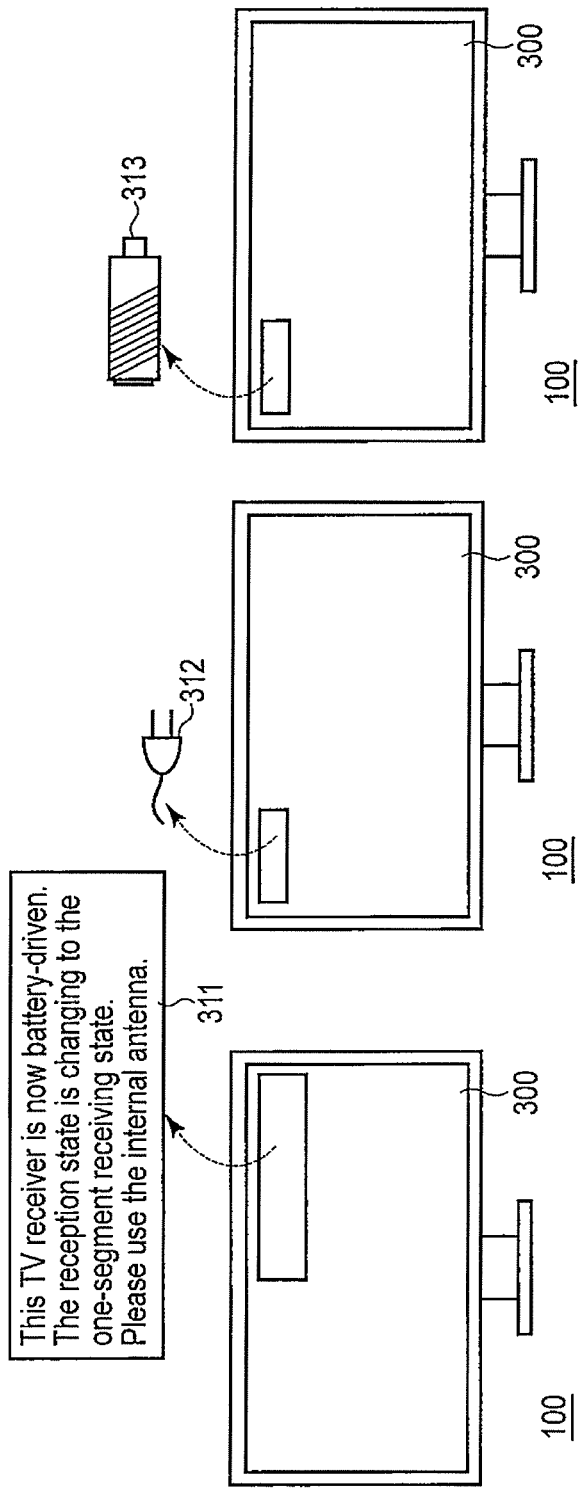
FIGS. 3A, 3B and 3C are exemplary figures illustrating typical examples of several display examples where the television receiver apparatus of FIG. 1 outputs to a display device.

FIG. 3A shows an exemplary guidance message the display 300 displays when the power supply is switched from the commercially available AC power supply to the battery 553. At the time the power supply is switched to the battery 553, or at a blackout, the power supply to the booster 102 of the external antenna 101 is stopped, and the display 300 may no longer display the image. In this case, the display 300 displays a guidance message 311 of "This TV receiver is now battery-driven. The reception state is changing to the one-segment receiving state. Please use the internal antenna." The term "internal antenna" may be replaced by "attached antenna" or "one-segment receiving antenna".

FIG. 3B shows a plug-shaped icon 312 the display 300 displays while the television receiver 100 is using the commercially available AC power supply.

FIG. 3C shows a battery-shaped icon 313 the display 300 displays while the television receiver 100 is using the battery 553. The battery-shaped icon 313 indicates the amount of power remaining in the battery 553. More precisely, the number of slant lines is proportional to the power remaining in the battery 553.

The form of icon is not limited to the form as shown in the figures. As long as the type of the power supply can be distinguished, various kinds of other modifications are possible, and the icon may be, e.g., a banner including characters. Further, it is not limited to the icons displayed on the screen. Whether the commercial power supply is used or the battery is used may be distinguished by a color of a light emitting unit such as an LED provided on the frame body of the display device 300.

A power saving button 722 can turn on/off the power saving state (or power saving mode) of the television receiver apparatus. When the power saving button 722 is manipulated, and the power saving mode is turned on, for example, the television receiver apparatus reduces the brightness of the screen and enters the power saving state to ensure long operation time of the battery 553, and the values of image quality parameters are changed to save power. As a result, the television receiver apparatus attains the power saving state. When the power saving button 722 is manipulated again in the power saving state, the power saving mode is turned off, and the brightness of the screen returns to the standard brightness. The power saving operation is not limited to the reduction of the brightness of the screen. The power saving operation may include various kinds of elements capable of reducing the power consumption such as reducing the size of the video, turning off an image quality enhancement processor 201a, turning off an interface control system 401a, and using headphone output instead of speaker output.

When a digital terrestrial broadcasting button 723 is manipulated, the television receiver apparatus is changed to full-segment reception state. When a one-segment button 724 is manipulated, the television receiver apparatus is changed to one-segment reception state. The indoor antenna 105 explained in FIG. 1 is used according to the full-segment reception state and the one-segment reception state. The power consumption is lower in the one-segment reception state than in the full-segment reception state. Accordingly, when the power saving button 722 is pressed, the power consumption can also be reduced by automatically changing from the full-segment reception state to the one-segment reception state. Further, when monaural audio output consumes less power than stereo audio output. Accordingly, when the power saving button 722 is pressed, the power consumption can also be reduced by automatically changing from the stereo output state to the monaural output state.

The antenna may be automatically switched from the UHF antenna 101 to the indoor antenna 105, or vice versa, by a switch provided on the antenna connection board 108. As shown in FIG. 2, the remote controller 700 has channel selection buttons 730, which are labeled "1" to "12," respectively. The remote controller 700 further has a volume button 726 and a channel switching button 727. The volume button 726 is used to adjust the volume of the sound. The volume of the sound is increased when the "+" end of the button 726 is pushed. The volume of the sound is decreased when the "−" end of the button 726 is pushed. Every time the channel switching button 727 is pushed at the upper end, the receiving channel of the TV may be changed to the immediately greater channel of the number. Every time the channel switching button 727 is pushed at the lower end, the receiving channel of the TV may be changed to the immediately smaller channel of the number.

The remote controller 700 has buttons 731, 732 and 733 arranged in a column. If pushed, the button 731 causes the display 300 to display, temporarily, detailed data items such as the name and channel number of the broadcast station transmitting the program now received, the one-segment or full-segment receiving mode, and the type of video data (monaural or stereophonic). If pushed, the button 732 labeled "silence button" causes the speaker 204 to stop outputting sound. If pushed, the button 733 labeled "quick menu" causes the display 300 to display a quick menu. The quick menu includes various image-setting items, sound-setting items, power-saving items and reception-setting items, etc. While looking at the quick menu displayed, the user moves a cursor in the screen of the display 300, to any desired item, and then pushes a select button 741 provided on the remote controller 700, thereby selecting the desired item. The display 300 then displays the item selected, in detail.

The remote controller 700 further has buttons 74L, 74R, 74U and 74D, which the user may control to move the cursor in the screen of the display 300. More precisely, if the buttons 74L, 74R, 74U and 74D are pushed, the cursor moves leftward, rightward, upward and downward, respectively, on the screen of the display 300. The select button 741 may be pushed to determine the desired item the cursor points to on the screen of the display 300.

The remote controller 700 still further has buttons 745, 746 and 747. If the button 754 is pushed, the display 300 will display a menu of image. If the button 746 is pushed, a program table is displayed. If the button 747 is pushed, the television receiver 100 will be set back to the previous operating mode.

Several buttons of the remote controller 700 such as buttons corresponding to the peak shift button 721, the power saving button 722, the volume adjustment button 726, and the channel switch button 727 are also provided on the manual operation unit 456.

FIG. 4 is a typical flowchart illustrating an example of operation of the television receiver apparatus of FIG. 1. When the plug 551 is connected to the outlet, it is determined whether the television receiver apparatus is turned on or not based on the power button of the manual operation unit 456 or the power button 711 of the remote controller 700 in block B102. When the power is turned on, operation in normal mode is performed in block B104. In the normal mode, the commercial power supply is used, and the television receiver apparatus attains the full-segment reception state with the full-segment reception circuit 112. In this state, the image quality enhancement processor 201a is turned on, an HDMI interface control system 401a is turned on, and the audio signal is output to a speaker (not shown). In the normal mode, power saving operation is not considered, and the elements other than the above are set in the state without considering power saving operation. It should be noted that not only the normal mode but also operation in a mode set immediately before the power off may be executed in block B104. This can be done by storing information about the mode set immediately before the power off in a RAM 451 when the power is turned off, and setting a mode based on this information in block B104.

Figure 5:
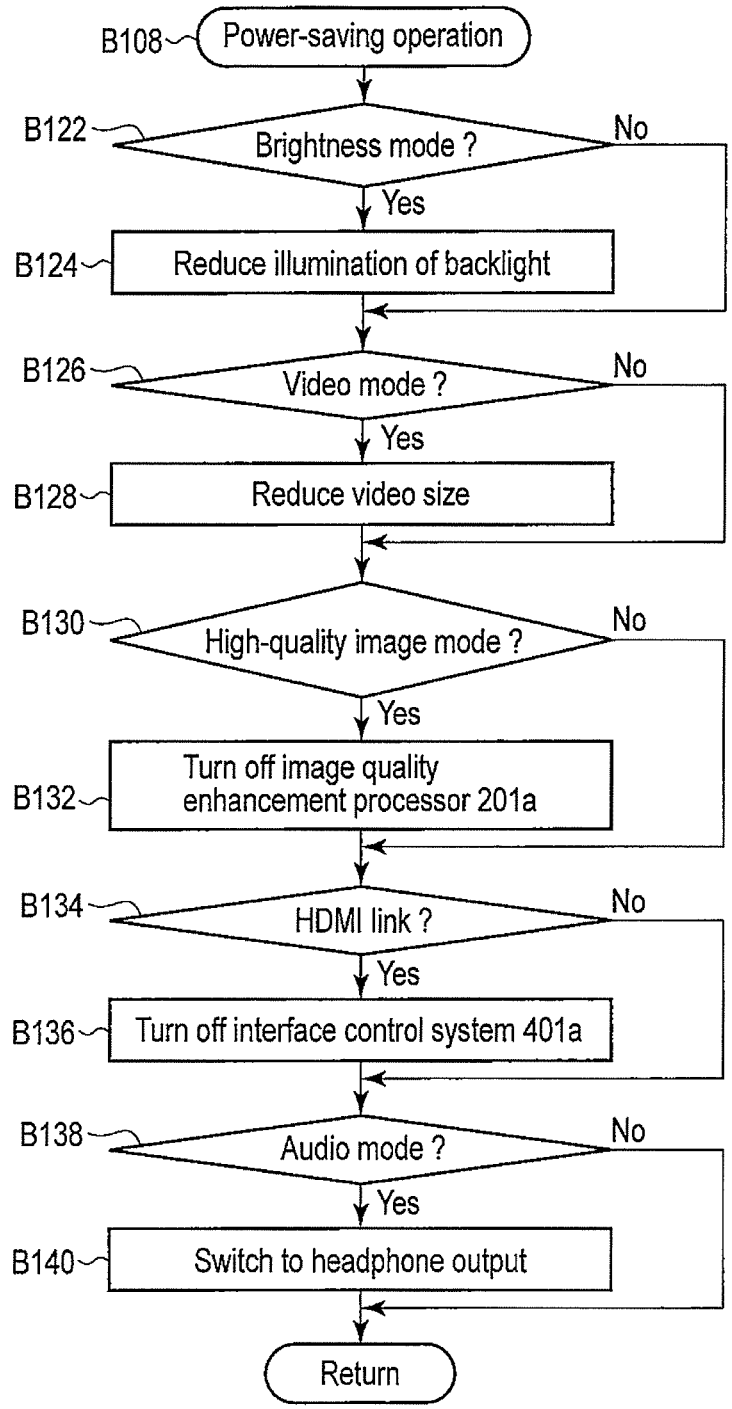
FIG. 5 is an exemplary flowchart illustrating a detailed power-saving operation in the flowchart of FIG. 4.

In block B106, it is determined whether the power saving button (not shown) of the manual operation unit 456 or the power saving button 722 of the remote controller 700 is turned on or not. Every time the power saving button is turned on, on/off of the power saving mode is switched in block B108. More specifically, when the power saving button is turned on while the power saving mode is off, the power saving mode is turned on, and when the power saving button is turned on while the power saving mode is on, the power saving mode is turned off. An example of operation of the power saving mode is shown in FIG. 5.

Figure 6:
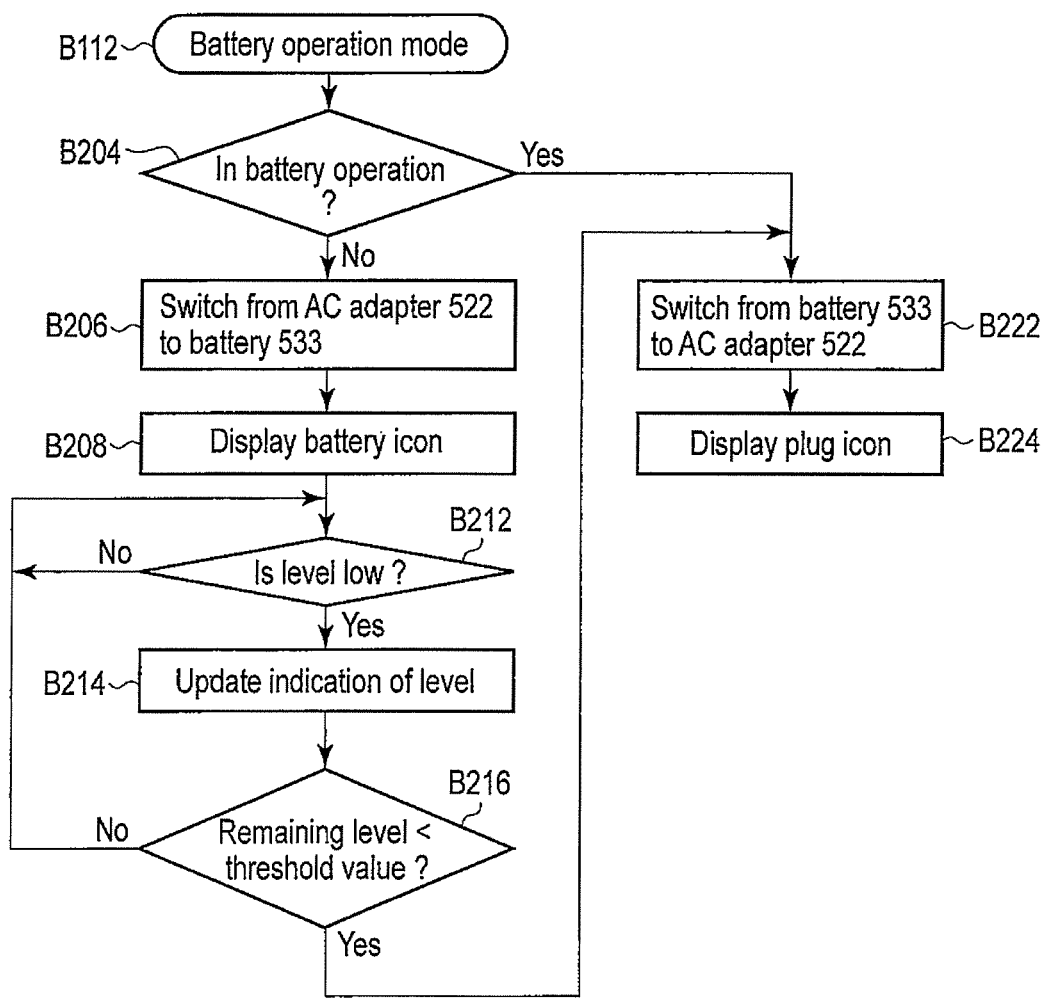
FIG. 6 is an exemplary flowchart illustrating a detailed battery operation mode in the flowchart of FIG. 4.

When the power saving button in the on state is not detected in block B106, or after block B108, it is determined whether the peak shift button (not shown) of the manual operation unit 456 or the peak shift button 721 of the remote controller 700 is turned on or not in block B110. Every time the peak shift button is turned on, on/off of the battery operation mode is switched in block B112. More specifically, when the peak shift button is turned on while the battery operation mode is turned off, the battery operation mode is turned on, and when the peak shift button is turned on while the battery operation mode is on, the power supply operation mode is turned off. An example of the battery operation mode is shown in FIG. 6.

When the peak shift button in the on state is not detected in block B110, or after block B112, it is determined whether the television receiver apparatus is turned off or not by the power button of the manual operation unit 456 or the power button 711 of the remote controller 700 in block B114. When the power is not turned off, block B106 is executed again.

In this manner, every time the power saving button and the peak shift button are manipulated, the power saving mode and the battery operation mode are respectively turned on/off. Therefore, the apparatus of the present embodiment is set to any one of four modes, i.e., (1) power saving mode, (2) battery operation mode, (3) (power saving+battery operation) mode, and (4) normal (non-power saving+commercial power supply operation mode) mode, according to the on/off states of the two modes. The power saving in (3) (power saving+battery operation) mode is power saving for ensuring the battery operation time. In contrast, (1) power saving mode is power saving for reducing the use of electricity supplied by the power company to the minimum during the commercial power supply operation in order to avoid major power outage during, e.g., the peak demand of electric power.

FIG. 5 illustrates an example of detailed power-saving operation in block B108 of FIG. 4. The power-saving operation includes a plurality of power saving elements, which element is used for the power saving can be defined in advance by user setting. In the initial setting, the power saving is executed with all the elements. In the user setting, a power saving element can be selected from the menu. In this case, for the sake of explanation, it is assumed that up to five power saving element can be set, i.e., (1) brightness of screen, (2) video size, (3) image quality enhancement processing, (4) HDMI link, and (5) audio output. It is determined whether each element is set or not, and power saving processing is carried out according to the power saving elements having been set. Other than the above, the power saving elements may include the one-segment reception state and the monaural audio output state.

In block B122, it is determined whether the brightness is set or not. When the brightness is set, the level of illumination of the backlight is reduced in block B124. As a result, the power consumption of the backlight can be reduced. The details of the illumination reduction operation will be explained later.

In block B126, it is determined whether the video size is set or not. When the video size is set, the size of the video to be displayed is reduced in block B128. This also reduces the power consumption. The details of the video size reduction operation will be explained later.

In block B130, it is determined whether the image quality enhancement processing is set or not. When the image quality enhancement processing is set, the image quality enhancement processor 201a is turned off in block B132. This can reduce the power consumption of the image quality enhancement processor 201a.

In block B134, it is determined whether the HDMI link is set or not. When the HDMI link is set is set, the interface control system 401a is turned off in order to turn off the HDMI link in block B136. This can reduce the power consumption of the interface control system 401a.

In block B138, it is determined whether the audio output is set or not. When the audio output is set, the audio output is switched to the headphone output in block B140. This can reduce the power consumption concerning the audio output.

Subsequently, the size reduction of the display image in block B228 will be explained. FIG. 7A illustrates an example of an image in normal mode. To save power, the display region may be set in a smaller region than a full screen, e.g., a central region (FIG. 7B). In this case, the screen is reduced. Therefore, it is not necessary to be in the full-segment reception state, and the television receiver apparatus may be automatically switched to the one-segment reception state.

If a high-luminance image 320 of the small size is displayed in the same part of the screen for a long term, the activating time of the high-luminance pixels defining the image 320 will differ from the activating time of the pixels surrounding the image 320, and the activating time of the backlight elements in the region of the image 320 will differ from the activating time of the backlight elements in the region surrounding the high-luminance image 320.

Consequently, the screen of the display 300 has a conspicuous line, in some cases, at the boundary between the part where the high-luminance image 320 is displayed and the part where no high-luminance images are displayed. In view of this, the television receiver 100 is designed to move the region of the image 320 of the small size on the screen as shown in FIG. 7B, FIG. 7C or FIG. 7D. The image 320 may be moved at various times, for example, when an advertisement starts, or when a prescribed period is passed, or when a prescribed period is passed then an advertisement starts.

Further, the size of the image 320 displayed plasma display as shown in FIG. 7E, for the purpose of saving power.

Figure 8A:
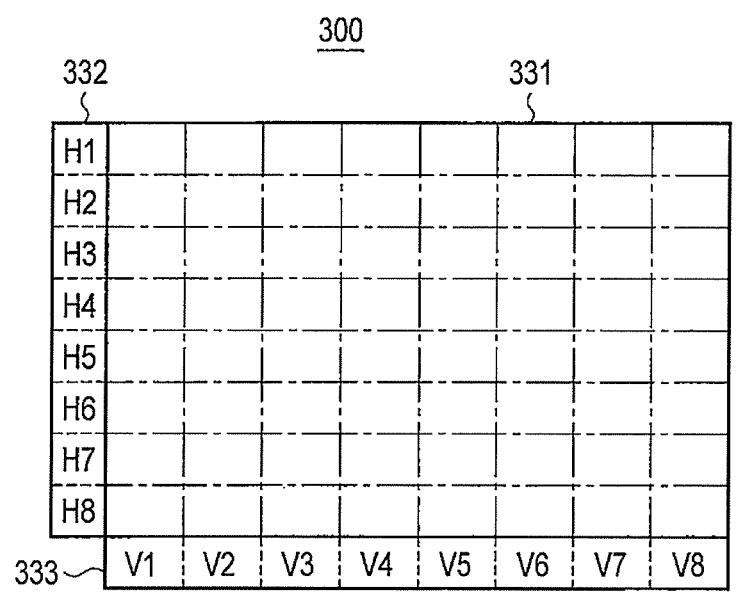
FIGS. 8A and 8B are exemplary figures illustrating an example of configuration of a backlight mechanism in the display device of the television receiver apparatus of FIG. 1.
Figure 8B:
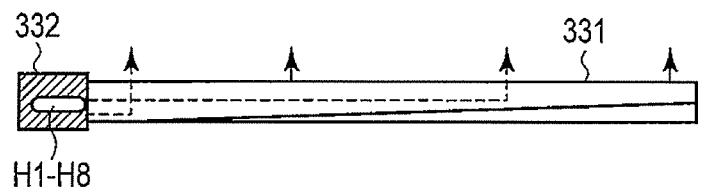

FIG. 8A and FIG. 8B show the structure of the backlight unit of the display 300, which can change the position and size of the display area of the display 300. The display 300 has a light guide plate 331. The backlight unit has horizontal light source elements 332 and vertical light source elements 333. The light beams emitted from the light source elements 332 and 333 are reflected in the light guide plate 331 and guided toward the front surface of the light guide plate 331, thus functioning as a backlight. The light source elements 332 and 333 are, for example, light-emitting diodes (LEDs). The light beams emitted from the light source elements 332 and 333 are diffused in the light guide plate 331. Therefore, light of uniform intensity emerges from the front surface of the light guide plate 331.

More specifically, the horizontal light source elements 332 are eight light sources H1 to H8, and the vertical light source elements 333 are eight light sources V1 to V8. If the light sources H1, H8, V1 and V8 are turned off, the peripheral part of the light guide plate 331 will appear dark. The boundary between the dark region and the bright region is not clear-cut. Nonetheless, the backlight region can be controlled.

Hence, in order to display such images 320 as shown in FIG. 7B to FIG. 7E, the signal processor 200 outputs a video signal so that the display 300 may display an image 320 surrounded by a dark frame at zero-luminance level. If the backlight unit of the display 300 operates, displaying such an image as shown in FIG. 7B, 7C, 7D or 7E, more power can be saved than otherwise.

Figure 9A:
FIGS. 9A and 9B are exemplary figures illustrating other examples of configurations of a backlight mechanism in the display device of the television receiver apparatus of FIG. 1.
Figure 9B:
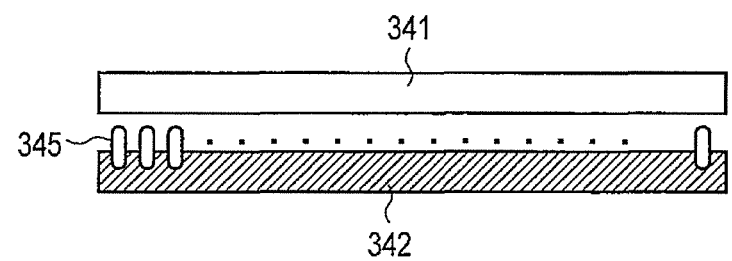

FIG. 9A and FIG. 9B show another structure the backlight unit of the display 300 may have. The display 300 has a glass substrate 341 and a substrate 342 arranged at the back of the glass substrate 341. On the substrate 342, light-emitting elements (LEDs) are arranged, in a two-dimensional pattern. The light-emitting elements can be turned on and off, in units of groups each including the same number of light-emitting elements. A backlight drive circuit (not shown) can drive any selected group of light-emitting elements. A light diffusion layer is formed on the back of the glass substrate 341, and light therefore emerges from the glass substrate 341 with uniform intensity. As a result, the boundary between any bright region and any dark region is not always clear on the entire glass substrate 341. The backlight region can be controlled, nevertheless.

In order to display such an image 320 as shown in FIG. 7B, 7C, 7D or 7E, the signal processor 200 outputs a video signal containing data representing a dark frame at zero-luminance level. If the display 300 displays an image 320 of this type (shown in FIG. 7B, 7C, 7D or 7E), its backlight unit consumes less power than otherwise.

The backlight unit of the display 300 is not limited to the configuration described above. The backlight unit may have a plurality of fluorescent lamps instead. Further, the number of segments into which the display region is divided is not limited to the number specified above. The number of segments can be changed as needed, in the same manner as described above.

Subsequently, the reduction of illumination of the backlight in block B224 will be explained. In the examples in FIGS. 7A to 7E, the region in which the backlight illuminates is reduced according to the reduction of the video size. As a result, the power consumption of the backlight is reduced. However, to save power, the video size may be full size, and only the level of illumination of the backlight may be controlled. In other words, by reducing the overall brightness, the power consumption is reduced, and the power saving effect can be obtained. In block B224, the video size is displayed in the full screen, and the backlight is partially extinguished. When the illumination of the backlight is reduced, it is not necessary to be in the full-segment reception state, and the television receiver apparatus may be switched to the one-segment reception state.

Figure 10A:
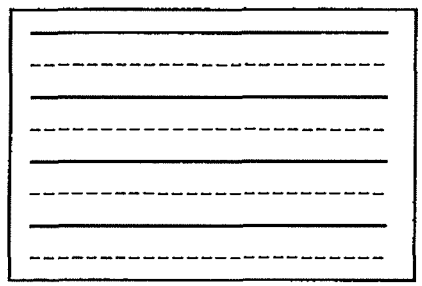
FIGS. 10A, 10B, 10C and 10D are exemplary figures illustrating examples where the display device of the television receiver apparatus of FIG. 1 reduces the brightness of the backlight.
Figure 10C:
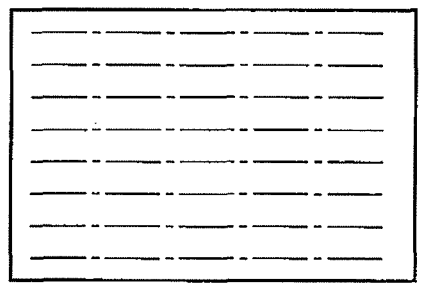
Figure 10B:
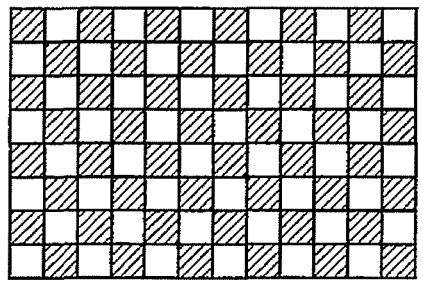

FIGS. 10A and 10B illustrate reduction of backlights. In the example of FIG. 10A, on (solid line) and off (broken line) are repeated for every control unit of the backlight in the horizontal lines, and the illumination of the backlight is reduced to the half. In the case of an edge-type backlight of FIGS. 8A and 8B, the emission sources H1, H3, H5, H7 are turned on, and the emission sources H2, H4, H6, H8 are turned off, so that the emission pattern of FIG. 10A can be achieved. In the case of a direct-type backlight of FIGS. 9A and 9B, only the light emitting elements directly under the horizontal lines from which light is to be emitted are turned on, so that the light emission pattern of FIG. 10A can be achieved.

In the example of FIG. 10B, on (hatched with solid lines) and off (non-hatched) are repeated for every control unit of the backlight in the horizontal and vertical directions, and the illumination of the backlight is reduced to the half. In the case of an edge-type backlight of FIGS. 8A and 8B, emission sources H1, H3, H5, H7, V1, V3, V5, V7 are turned on, and emission sources H2, H4, H6, H8, V2, V4, V6, V8 are turned off, so that the emission pattern of FIG. 10B can be achieved. In the case of a direct-type backlight of FIGS. 9A and 9B, only the light emitting elements directly under the horizontal lines from which light is to be emitted are turned on, so that the light emission pattern of FIG. 10B can be achieved.

In FIGS. 10A and 10B, the rate of reduction is 50%. However, the rate of reduction is not limited thereto. The rate of reduction can be set to any value according to the power saving effect to be achieved.

FIG. 10C is an example for reducing the illumination of each light source of the backlight. An alternate long and short dash line indicates reduction of illumination. The rate of reduction is not limited to half, and may be set to any rate of reduction.

According to FIGS. 10A to 10O, the video is displayed in full-screen, but by reducing the illumination of the backlight, the power consumption can be reduced with any rate.

Figure 10D:
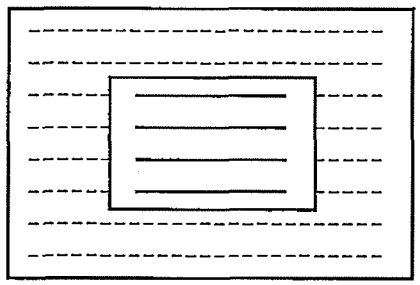

FIG. 10D illustrates an example where the light emitting region of the backlight is limited to the central portion. In many cases, the central portion of the video is important, and therefore, even if the illumination of the backlight at the peripheral portion is reduced, this does not cause any problem when the user watches the program in many cases.

The reduction control of FIGS. 10A and 10B or the illumination variation control of the light source of FIG. 100 may be combined with the light emission region control of FIG. 10D.

Displays having a large screen have been developed for use in television receivers. The light sources used in these displays are, for example, fluorescent lamps or light-emitting elements (e.g., LEDs, organic electroluminescent diodes or plasma displays).

To save power in the large-screen display of the television receiver will greatly contribute to power saving in society. To switch the reception state of the television receiver, from the full-segment receiving state to the one-segment receiving state, will also save much power.

The television receiver 100 can perform the operations described above. More precisely, the television receiver 100 can perform various combinations of operations, in accordance with the application program provided in the control block 400.

In the one-segment receiving state, the control block 400 sets the display 300 supplied with the video signal output from the signal processor 200, to a full-screen display state. In another embodiment, the control block 400, in the one-segment receiving state, sets the display 300 supplied with the video signal output from the signal processor 200, to a partial-screen display state, and then turn off some of the light-emitting elements of the backlight unit. In still another embodiment, the control block 400 can, in the one-segment receiving state, set the display 300 supplied with the video signal output from the signal processor 200, from the full-screen display state to the partial-screen display state, and then turn off some of the light-emitting elements of the backlight unit, when the power in the battery 553 decreases to a prescribed value. In another embodiment, the control block 400 can, in the one-segment receiving state, set the display 300 supplied with the video signal output from the signal processor 200, to the full-screen display state or the partial-screen display state, and turn off some of the light-emitting elements of the backlight unit, thereby to set the display 300 to one display state in response to the selection signal the user has input. Further, the display 300 can display a message, prompting the user to operate the remote controller 700.

Moreover, in another embodiment, the tuner 110 can receive a broadcast signal from the external antenna 101 and the power output circuit 500 can supply power to the booster 102 of the external antenna 101, if the reception state has been set to the one-segment receiving state. In still another embodiment, the tuner 110 can receive the broadcast signal from the external antenna 101 and the power output circuit 500 can stop supplying power to the booster 102 of the internal antenna 105, if the reception state has been set to the one-segment receiving state. In a further embodiment, tuner 110 can receive a broadcast signal from the attached antenna and the power output circuit 500 can stop supplying power to the booster 102 of the external antenna 101, if the reception state has been set to the one-segment receiving state. In any of these cases, the antenna may be switched automatically, or the user may switch the antenna in accordance with the instruction the display 300 shows.

Moreover, in still another embodiment, the image 320 shown in FIG. 7A to FIG. 7E can be changed in size in accordance with the power remaining in the battery 553 or in response to an instruction the user has input. In addition, the audio-system circuits may be turned off, while keeping the video signal active, thereby to save power. Conversely, the video-system circuits may be turned off, while keeping the audio signal active, thereby to save power.

The television receiver 100 according to any one of the embodiments described above can save power, while performing all of its functions. Further, even upon a blackout, the television receiver can save power, while performing all of its functions. Moreover, the television receiver 100, which has not only ordinary functions, but also a power-saving function, may be bought by consumers willing to save power, ultimately reducing the power consumption in society.

In order to save power, the display 300 may be controlled to set at least one-third (⅓) of the screen of the display 300 to low luminance in the one-segment receiving state, and display the image in the remaining part of the screen. In this case, those of the light-emitting elements of the backlight unit, which lie behind one-third (⅓) of the screen, are turned off. Moreover, the image so displayed can move, with time, over the entire screen. Said remaining part of the screen can be changed in size in accordance with how much power should be saved in the television receiver 100.

FIG. 11 shows an exemplary power-saving menu the user may use to save power in the television receiver 100. If the user pushes the quick menu button 733, the display 300 displays the quick menu showing four items, i.e., "video setting", "audio setting", "power-save setting" and "receiver setting". The user pushes the button 74U or button 74D, moving the cursor to the desired item, and then pushes the select button 741, selecting the desired item. Assume that the user moves the cursor to, for example, the power-save setting 331 and then pushes the select button 741. Then, the display 300 displays the menu of the next layer, which consist of "program data acquisition", "automatic power-off", "off to no on-air signal", "off to no external input" and "battery recharging at night". If the user selects one of these menu items, the display 300 displays an on-button and an off-button beside the menu item selected.

If the user moves the cursor to, for example, "program data acquisition (EPG data)", an on-button and an off-button are displayed beside "program data acquisition". The user operates the button 74U or 74d, moving the cursor to, for example, "on-button", and then pushes the select button 741. In this case, the television receiver 100 acquires a digital broadcast program while the power switch of the television receiver 100 remains off (that is, while the receiver 100 remains in the standby state). If the user selects "off-button", the television receiver 100 will acquire no program data.

Assume that the cursor is moved to "automatic power-off". Then, an on-button and an off-button are displayed beside "automatic power-off". The user operates the button 74U or 74d, moving the cursor to, for example, "on-button", and then pushes the select button 741. In this case, the television receiver 100 stops receiving power and is turned off, assuming the standby state, if it remains not operated at all for three hours. If the user selects "off-button", the television receiver 100 keeps receiving power even if it remains not operated at all for three hours.

Further assume that the cursor is moved to "off to no on-air signal". Then, an on-button and an off-button are displayed beside "off to no on-air signal". The user operates the button 74U or 74d, moving the cursor to, for example, "on-button", and then pushes the select button 741. In this case, the television receiver 100 stops receiving power, and assumes the standby state if it receives no broadcast signals for about 15 minutes. If the user selects "off-button", the television receiver 100 keeps receiving power even if it keeps receiving no signals.

Assume that the cursor is moved to "off to no external input", Then, an on-button and an off-button are displayed beside "off to no external input". The user operates the button 74U or 74d, moving the cursor to, for example, "on-button", and then pushes the select button 741. If the television receiver 100 keeps receiving no signals for 15 minutes in an external-input selecting mode, the television receiver 100 stops receiving power, and assumes the standby state. If the user selects "off-button", the television receiver 100 keeps receiving power even if it keeps receiving no signals.

Assume that the cursor is moved to "battery recharging at night". Then, an on-button and an off-button are displayed beside "battery recharging at night". The user operates the button 74U or 74d, moving the cursor to, for example, "on-button," and then pushes the select button 741. In this case, the battery 553 is automatically recharged, for example, from 10:00 PM to 9:00 AM (if the television receiver 100 is in the standby state). If the user moves the cursor to "off-button" and pushes the select button 741, the battery 553 is set to be recharged when the television receiver 100 is in the standby state.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television receiver apparatus capable of operating with a battery, comprising:
   a receiver configured to receive first and second signals, the first signal specifying a state of a battery operation and the second signal specifying a state of a power-saving operation;
   a power supply controller configured to control power supply according to the first and the second signals; and
   a charger configured to charge the battery if the apparatus is in a standby state in a predetermined time period, wherein
   the power supply controller executes
      a first power control using a commercial power supply if the first signal specifies an off-state of the battery operation and the second signal specifies an off-state of the power-saving operation,
      a second power control using the commercial power supply if the first signal specifies an off-state of the battery operation and the second signal specifies an on-state of the power-saving operation,
      a third power control using the battery if the first signal specifies an on-state of the battery operation and the second signal specifies an off-state of the power-saving operation, and
      a fourth power control using the battery if the first signal specifies an on-state of the battery operation and the second signal specifies an on-state of the power-saving operation,
   the second power control consumes less power than the first power control, and
   the fourth power control consumes less power than the third power control.

2. The apparatus of claim 1, further comprising a display, wherein the power supply controller comprises a module configured to reduce illumination of a backlight of the display if the second signal specifies an on-state of the power-saving operation.

3. The apparatus of claim 2, wherein the power supply controller comprises a module configured to turn off every alternate line or every multiple lines in the backlight of the display if the second signal specifies an on-state of the power-saving operation.

4. The apparatus of claim 2, wherein the power supply controller comprises a module configured to partially turn off the backlight of the display if the second signal specifies an on-state of the power-saving operation.

5. The apparatus of claim 4, further comprising a module configured to reduce the size of a video signal displayed on the display according to a partially-turned off region of the backlight if the second signal specifies an on-state of the power-saving operation.

6. The apparatus of claim 1, further comprising an image quality enhancement processor,
   wherein the power supply controller comprises a module configured to turn off the image quality enhancement processor if the second signal specifies an on-state of the power-saving operation.

7. The apparatus of claim 1, further comprising:
   a terminal of a predetermined standard connected to an external device via an interface cable of the predetermined standard; and
   an inquiry module configured to determine whether the interface cable is connected to the terminal or not,
   wherein the power supply controller comprises a module configured to turn off the inquiry unit if the second signal specifies an on-state of the power-saving operation.

8. The apparatus of claim 1, further comprising a headphone terminal,
   wherein the power supply controller comprises a module configured to output an audio signal to the headphone terminal if the second signal specifies an on-state of the power-saving operation.

9. The apparatus of claim 1, wherein the first and the second signals are transmitted from a remote controller.

10. The apparatus of claim 1, further comprising a display configured to display a first icon indicating that the battery operation is in an off-state and a second icon indicating that the battery operation is in an on-state and indicating a remaining battery capacity.

11. A control method for a television receiver apparatus capable of operating with a battery, comprising:
    receiving first and second signals, the first signal specifying a state of a battery operation and the second signal specifying a state of a power-saving operation;
    charging the battery if the apparatus is in a standby state in a predetermined time period; and
    controlling power supply according to the first and the second signals, wherein
    the controlling comprises:
       a first power controlling using a commercial power supply if the first signal specifies an off-state of the battery operation and the second signal specifies an off-state of the power-saving operation,
       a second power controlling using the commercial power supply if the first signal specifies an off-state of the battery operation and the second signal specifies an on-state of the power-saving operation,
       a third power controlling using the battery if the first signal specifies an on-state of the battery operation and the second signal specifies an off-state of the power-saving operation, and a fourth power controlling using the battery if the first signal specifies an on-state of the battery operation and the second signal specifies an on-state of the power-saving operation, the second power controlling consumes less power than the first power controlling, and the fourth power controlling consumes less power than the third power controlling.

12. The method of claim 11, wherein the controlling comprises reducing illumination of a backlight of a display if the second signal specifies an on-state of the power-saving operation.

13. The method of claim 12, wherein the controlling comprises turning off every alternate line or every multiple lines in the backlight of the display if the second signal specifies an on-state of the power-saving operation.

14. The method of claim 12, wherein the controlling comprises partially turning off the backlight of the display if the second signal specifies an on-state of the power-saving operation.

15. The method of claim 14, further comprising reducing the size of a video signal displayed on the display according to a partially-turned off region of the backlight if the second signal specifies an on-state of the power-saving operation.

16. The method of claim 11, wherein the controlling comprises turning off an image quality enhancement processor if the second signal specifies an on-state of the power-saving operation.

17. The method of claim 11, wherein the controlling comprises turning off an inquiry unit configured to determine whether an interface cable is connected if the second signal specifies an on-state of the power-saving operation.

18. The method of claim 11, wherein the controlling comprises outputting an audio signal to a headphone terminal if the second signal specifies an on-state of the power-saving operation.

19. The method of claim 11, wherein the first and the second signals are transmitted from a remote controller.

20. The method of claim 11, further comprising displaying a first icon indicating that the battery operation is in an off-state and a second icon indicating that the battery operation is in an on-state and indicating a remaining battery capacity.

* * * * *